US012070882B2

(12) United States Patent
Yanev et al.

(10) Patent No.: US 12,070,882 B2
(45) Date of Patent: Aug. 27, 2024

(54) FOAMING TECHNOLOGY IN LONG GLASS FIBER FILLED MATERIALS

(71) Applicant: SABIC GLOBAL TECHNOLOGIES B.V., Bergen op Zoom (NL)

(72) Inventors: Angel Yanev, Maastricht (NL); Marnik Vaes, Zonhoven (BE); Warden Schijve, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 592 days.

(21) Appl. No.: 16/745,505

(22) Filed: Jan. 17, 2020

(65) Prior Publication Data

US 2020/0147843 A1 May 14, 2020

Related U.S. Application Data

(62) Division of application No. 15/304,059, filed as application No. PCT/IB2015/052794 on Apr. 16, 2015, now abandoned.

(60) Provisional application No. 61/980,228, filed on Apr. 16, 2014.

(51) Int. Cl.
| B29C 45/00 | (2006.01) |
| B29C 44/42 | (2006.01) |
| B29C 45/17 | (2006.01) |
| B29C 45/18 | (2006.01) |
| B29K 105/04 | (2006.01) |
| B29K 105/12 | (2006.01) |
| B29K 309/08 | (2006.01) |
| B29K 509/08 | (2006.01) |

(52) U.S. Cl.
CPC .......... *B29C 45/0005* (2013.01); *B29C 44/42* (2013.01); *B29C 45/18* (2013.01); *B29C 2045/1722* (2013.01); *B29K 2105/04* (2013.01); *B29K 2105/12* (2013.01); *B29K 2309/08* (2013.01); *B29K 2509/08* (2013.01)

(58) Field of Classification Search
CPC ..... B29C 44/42; B29C 45/18; B29C 2509/08; B29C 2045/1722
See application file for complete search history.

(56) References Cited

U.S. PATENT DOCUMENTS

| 5,342,559 | A * | 8/1994 | Kamiguchi ............. B29C 45/77 |
| | | | 425/149 |
| 5,773,042 | A | 6/1998 | Amano et al. |
| 5,816,698 | A | 10/1998 | Durina et al. |
| 6,165,396 | A | 12/2000 | Sato et al. |
| 6,368,701 | B1 | 4/2002 | Nomura et al. |
| 6,623,838 | B1 | 9/2003 | Nomura et al. |
| 6,686,034 | B1 | 2/2004 | Mizukami et al. |
| 7,364,788 | B2 | 4/2008 | Kishbaugh et al. |
| 7,678,854 | B2 | 3/2010 | Lee et al. |
| 7,977,449 | B2 | 7/2011 | Bradley |
| 2002/0014709 | A1* | 2/2002 | Arai ........................ B29C 44/04 |
| | | | 264/102 |
| 2003/0003291 | A1 | 1/2003 | Shah et al. |
| 2004/0159965 | A1* | 8/2004 | Oka ........................ B29C 45/77 |
| | | | 264/40.1 |
| 2005/0042434 | A1 | 2/2005 | Kishbaugh et al. |
| 2009/0042011 | A1 | 2/2009 | Jaarsma |
| 2010/0140824 | A1 | 6/2010 | Jaarsma |
| 2013/0285273 | A1 | 10/2013 | Yusa et al. |
| 2014/0061966 | A1 | 3/2014 | Bandyopadhyay et al. |
| 2016/0237269 | A1 | 8/2016 | Goda et al. |
| 2017/0036378 | A1 | 2/2017 | Yanev et al. |

FOREIGN PATENT DOCUMENTS

| CN | 101712789 A | 5/2010 | |
| CN | 102675734 A | 9/2012 | |
| DE | 102006030403 A1 | 3/2007 | |
| DE | 102005061053 A1 | 6/2007 | |
| DE | 102009012481 B3 | 9/2010 | |
| DE | 102012001108 A1 | 7/2013 | |
| EP | 1806217 A1 | 7/2007 | |
| JP | 01280522 A * | 11/1989 | ......... B29C 45/5008 |
| JP | H08085128 A | 9/1994 | |
| JP | 08085128 A * | 4/1996 | |
| JP | 2001353750 A | 12/2001 | |
| JP | 2003326571 A | 11/2003 | |
| JP | 2004510021 A | 4/2004 | |
| JP | 2007054993 A | 3/2007 | |
| JP | 2007210323 A | 8/2007 | |
| JP | 2008001015 A | 1/2008 | |
| WO | WO-0158661 A1 * | 8/2001 | ............. B29C 45/50 |

(Continued)

OTHER PUBLICATIONS

Machine translation JPH0885128A (Year: 1996).*
Machine translation JPH01280522A (Year: 1989).*
Machine translation WO0158661A1 (Year: 2001).*
"The Process"; Trexel—http://www.trexel.com/injection-molding-solutions/the_process.php; 2018, 2 pages.
"Gas-assisted injection molding of long glass Fiber Reinforced Thermoplastics"; Journal of Materials Processing & Manufacturing Science, 1997, vol. 6, Issue 1, pp. 63-70.
Chinese Patent No. 101712789; Date of Publication: May 26, 2010; Abstract Only, 2 pages.
Chinese Patent No. 102675734; Date of Publication: Sep. 19, 2012; Abstract Only, 2 pages.
German Patent No. 102005061053; Date of Publication: Jun. 21, 2007; Abstract Only, 1 page.

(Continued)

*Primary Examiner* — Abbas Rashid
*Assistant Examiner* — Wayne K. Swier
(74) *Attorney, Agent, or Firm* — CANTOR COLBURN LLP

(57) ABSTRACT

A foamed part, includes: a long glass fiber filled polymeric material, wherein the long glass fibers have an initial length before molding of the foamed part and a final length after molding of the foamed part; wherein a post-molding length of the long glass fibers in the foamed part is greater than or equal to a post-molding length of long glass fibers in a similarly dimensioned foamed part made without a pressurized plasticizing unit.

16 Claims, 10 Drawing Sheets

(56) References Cited

FOREIGN PATENT DOCUMENTS

WO      2011142305 A1    11/2011

OTHER PUBLICATIONS

German Patent No. 102006030403; Date of Publication: Mar. 15, 2007; Abstract Only, 1 page.
German Patent No. 102009012481; Date of Publication: Sep. 23, 2010; Abstract Only, 1 page.
Inoue, Akira et al.; "Effect of screw design on fiber breakage and dispersion in injection-molded long glass-fiber- reinforced polypropylene", Journal of Composite Materials, 2015, vol. 49, pp. 75-84.
International Search Report for International Application No. PCT/IB2015/052794; Date of Mailing: Sep. 30, 2015; 5 pages.
Japanese Patent No. 2001353750; Date of Publication: Dec. 12, 2001; Abstract Only, 2 pages.
Japanese Patent No. 2008001015; Date of Publication: Jan. 10, 2008; Abstract Only, 2 pages.
Japanese Patent No. 2008001015; Date of Publication: Jan. 10, 2008; English Translation, 48 pages.
Knights, M., "New Screw Design for Long-Glass Microcellular Foam Molding", Plastics Technology, 2007, 2 pages.
Knights, M., "NPE News in Injection Molding", Plastics Technology, 2009, 6 pages.
Laird, K., "Arburg Presents innovative foaming solution at Technology Days", Plastics Today, 2015, 3 pages.
Mucell, "Microcellular Foaming Technology for Injection Molding Industry", MuCell Processes Trexel Inc., 8 pages.
Roch et al., "LFT foam—Lightweight potential for semi-structural components through the use of long-glass-fiber-reinforced thermoplastic foams", AIP Conference Proceedings 1593, 471 (2014).
Roch et al., "Lightweight Potential of Fiber-Reinforced Foams", Cellular Polymers, vol. 32, No. 4, 2013 Cellular Polymers, vol. 32, No. 4, 2013, pp. 213-228.
Translation of DE102012001108, Anselmann et al., Jul. 25, 2013, p. 1-14, Patent Translate.
Vu-Khanh, T. et al., "The effects of injection molding on the mechanical behavior of long-fiber reinforced PBT/PET plends"; Composites Science and Technology, 1991, vol. 40, pp. 423-435.
Written Opnion of the International Search Report for International Application No. PCT/IB2015/052794; Date of Mailing: Sep. 30, 2015; 8 pages.
Zhang et al., "Reduced fibre breakage in a glass-fibre reinforced thermoplastic through foaming"; Composites Science and Technology, 2005, vol. 65, Issue 14, pp. 2240-2249.

\* cited by examiner

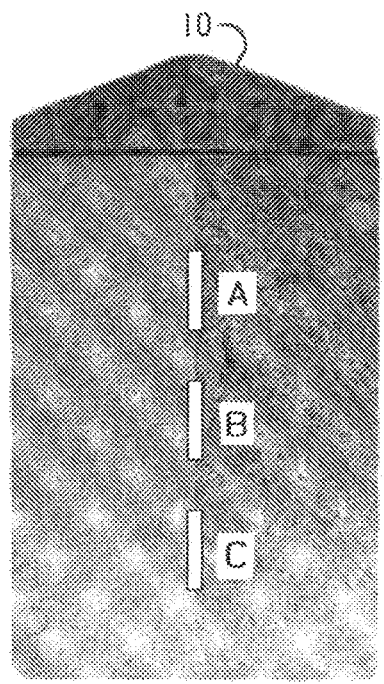
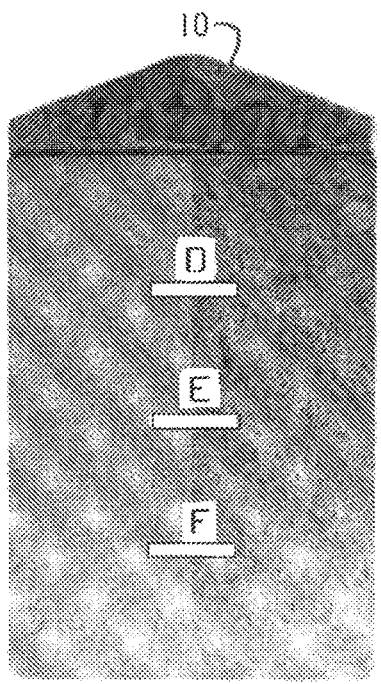
Fig. 3A       Fig. 3B
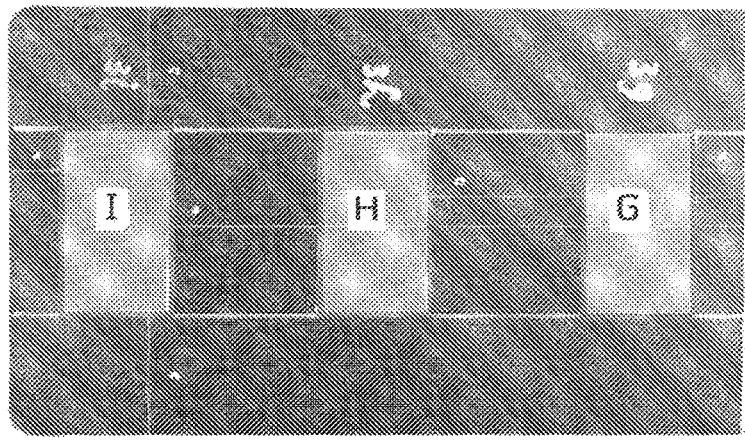
Fig. 3C

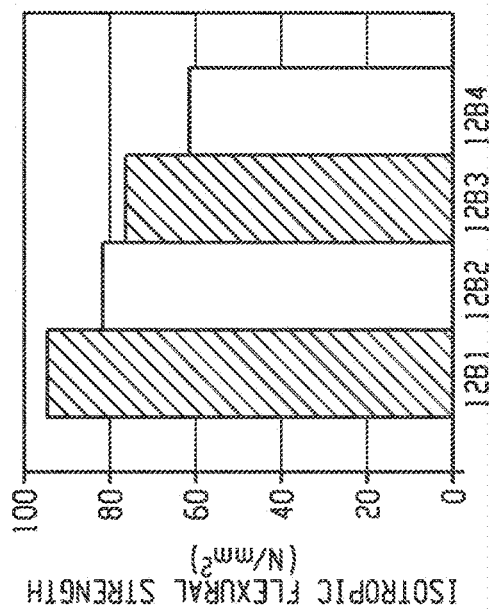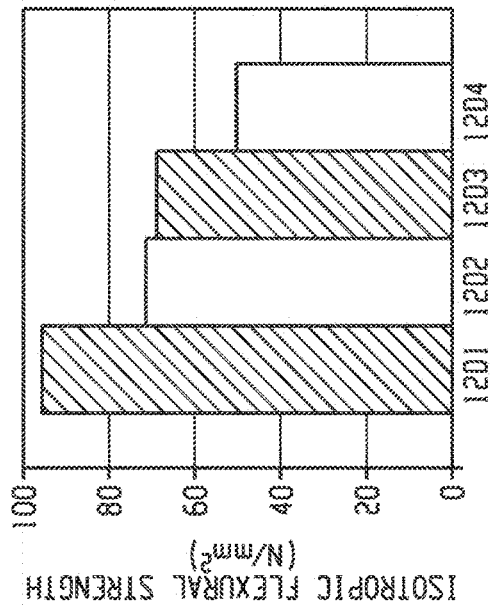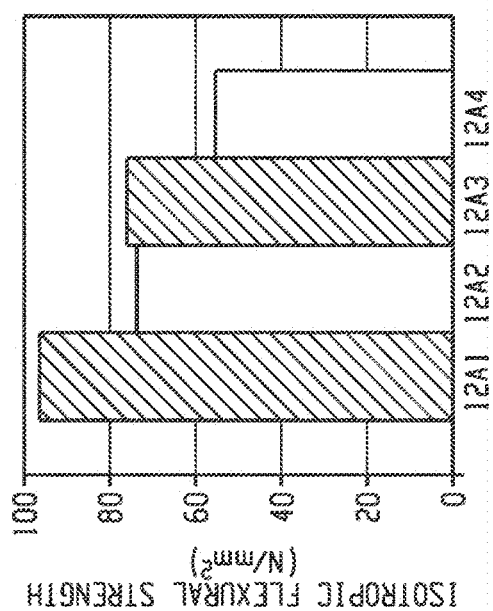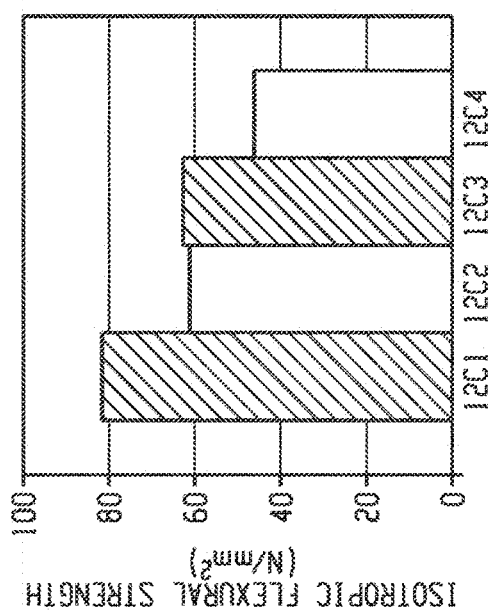

FOAMING TECHNOLOGY IN LONG GLASS FIBER FILLED MATERIALS

CROSS REFERENCE TO RELATED APPLICATIONS

This application is a Divisional of U.S. application Ser. No. 15/304,059 filed on Oct. 13, 2016 which is a 371 of International Application No. PCT/IB2015/052794, filed Apr. 16, 2015, which claims priority to U.S. Application No. 61/980,228, filed Apr. 16, 2014 all of which are incorporated herein by reference in their entirety.

BACKGROUND

Certain formed polymeric parts, e.g., automotive parts, are continually desired to be lighter in weight without a reduction in mechanical or physical properties of the part. Foamed injection molding can provide a lighter weight part as compared to a part formed by other methods, but using foamed injection molding with long glass fiber filled materials can result in fiber breakage with intrinsic loss of mechanical properties such as strength, stiffness, and impact resistance.

Thus there is a need in the art for a part made from a long glass fiber filled material that is lighter in weight without a breakage in the long glass fibers.

BRIEF DESCRIPTION

The above described and other features are exemplified by the following figures and detailed description.

A method of making a foamed part, comprises: introducing a long glass fiber filled polymeric material to a hopper of an injection molding machine, wherein the long glass fibers have a pre-molding length; melting the long glass fiber filled polymeric material to form a melt; pressurizing a plasticizing unit of the injection molding machine with a blowing agent, wherein a seal is located between a rotating part and a fixed part of the plasticizing unit; having a seal between the rotating and fixed parts of the plasticizing unit; sealing the plasticizing unit with an airlock mounted between a barrel of the injection molding machine and the hopper; increasing a pressure of the blowing agent and increasing a back pressure of the injection molding machine to homogenize the melt and the blowing agent; and forming the foamed part; wherein a post-molding length of the long glass fibers in the foamed part is greater than or equal to a post-molding length of long glass fibers in a similarly dimensioned foamed part made without the pressurized plasticizing unit.

A foamed part, comprises: a long glass fiber filled polymeric material, wherein the long glass fibers have an initial length before molding of the foamed part and a final length after molding of the foamed part; wherein a post-molding length of the long glass fibers in the foamed part is greater than or equal to a post-molding length of long glass fibers in a similarly dimensioned foamed part made without a pressurized plasticizing unit.

BRIEF DESCRIPTION OF THE DRAWINGS

Refer now to the figures, which are exemplary embodiments, and wherein the like elements are numbered alike.

FIG. 3A to 3C are pictures of a foamed plaque illustrating positions where cut sections of the cell structure via light microscopy and density measurements were taken.

FIGS. 12A-12D are graphical illustrations of the flexural strength of various molded samples as described herein.

DETAILED DESCRIPTION

Figure 1A:
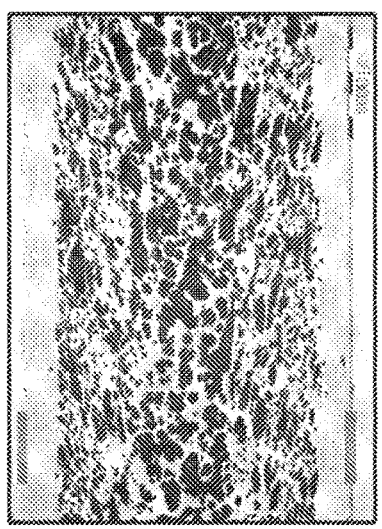
FIGS. 1A to 1F are pictures of cut sections of foamed plaques showing the cell structure and density with a 30% weight reduction.
Figure 1D:
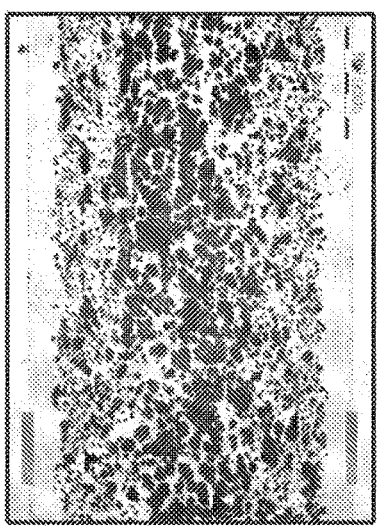
Figure 1B:
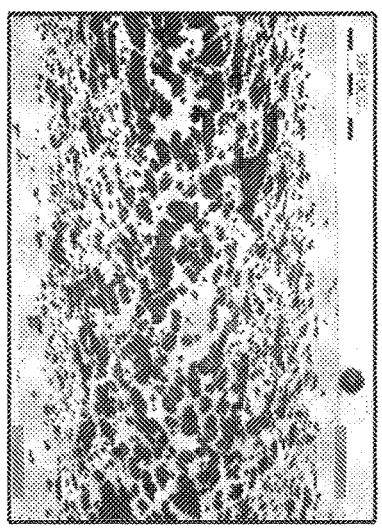
Figure 1E:
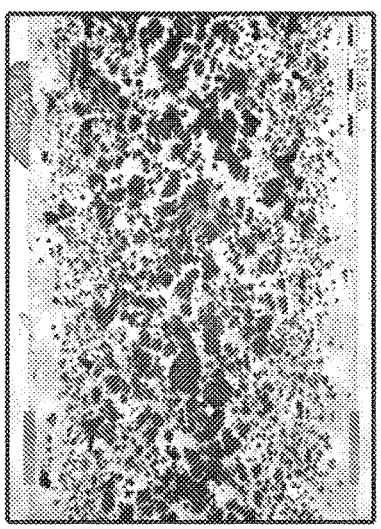
Figure 1C:
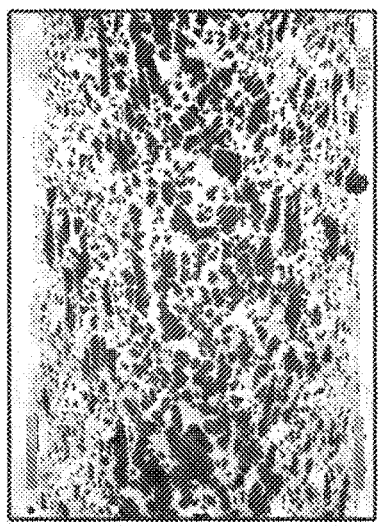
Figure 1F:
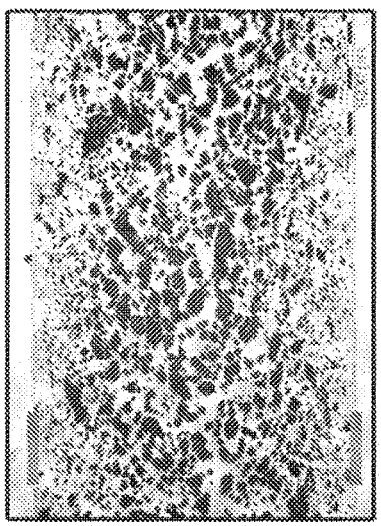
Figure 2A:
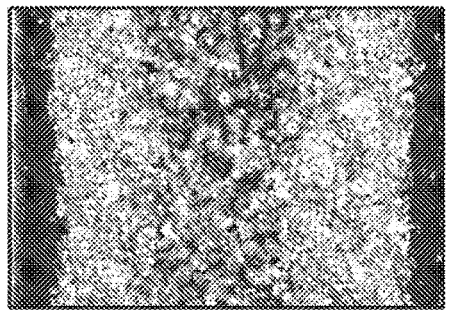
FIGS. 2A to 2F are pictures of cut sections of foamed plaques showing the cell structure and density with a 20% weight reduction.
Figure 2B:
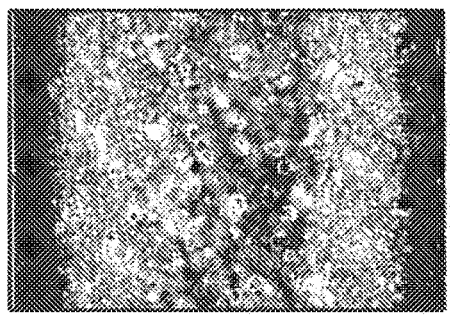
Figure 2C:
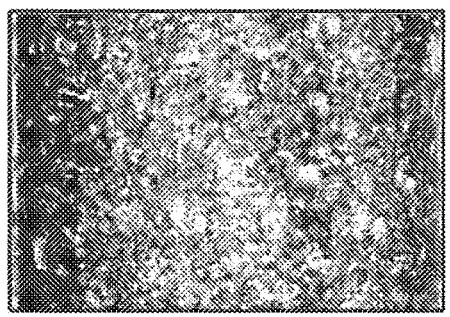
Figure 2D:
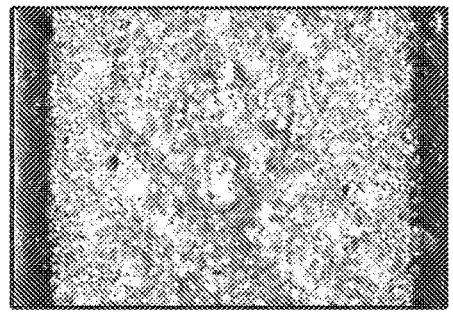
Figure 2E:
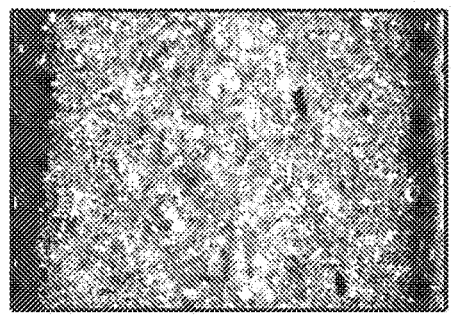
Figure 2F:
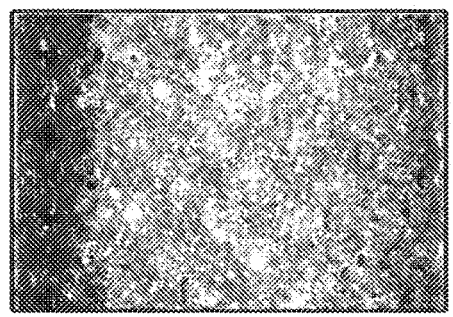

Disclosed herein are foamed parts and methods of making foamed parts. The foamed part can be made from a long glass fiber filled polymeric material. The long glass fibers can have an initial length before molding of the foamed part and a final length after molding of the foamed part. The final length of the long glass fibers in the foamed part is greater than or equal to a final length of long glass fibers in a non-foamed part. Without breakage of the long glass fibers in the foamed part, certain mechanical properties such as strength, stiffness, and impact resistance can be comparable to non-foamed (e.g., solid) parts, with a reduction in weight as compared to solid parts. The technology used to manufacture parts from long glass fiber filled materials such that an average fiber length in the final part can be reduced by less than a reduction in an average fiber length in the final part made by other foaming technologies, e.g., using a chemical blowing agent or physical foaming agent, can include placing an injection screw under pressure with a relatively flat pressure profile. Such a manufacturing process can help ensure the long glass fibers do not break during the forming process.

Foaming technologies, such as the use of a chemical blowing agent or physical foaming agent, can lead to excessive fiber breakage, which directly affects the mechanical and physical properties of a part made with these methods using a long glass fiber filled material. Consequently, performance enhancements observed by using long glass fiber filled materials, instead of short glass fiber filled materials can be erased. Long glass fiber breakage can occur due to shear stress applied during the homogenization phase of the process where the gas, (whether coming from a chemical or physical blowing agent), is homogenized with the molten polymeric material. If the glass fiber length can be held constant, or even increased, as compared to other processes, during the injection foaming process, the reduction of properties, including impact resistance, due to foaming, can be minimized and even further weight reduction in the resulting part can be achieved.

The use of foaming agents in polymeric materials can reduce density and thus, also reduce weight of a final part. The addition of the foaming agents, whether chemical or physical, leads to the formation of a cellular structure inside the molded part through the dispersion of gas bubbles inside the basic polymeric material. Foam molding can offer the possibility of increasing the size of a part without increasing the weight and reducing the weight of a part with a controlled change in properties. Other valuable advantages for foaming are cycle time reduction, improved dimensional uniformity, and increased cavitation in a mold.

In chemical foaming, the gas is generated by chemical decomposition of a blowing agent. The blowing agent is added as a masterbatch system. The decomposition is initiated by heat of the melt during plasticizing. Endothermic foaming agents are mainly used for injection molding. They are based on bicarbonate and citric acid substances. Chemical foaming involves mixing a chemical blowing agent with pellets prior to the pellets being fed into the feed throat of an injection molding machine. The blowing agent decomposes while the resin is melting, releasing a gas such as nitrogen that is mixed with the polymer. Endothermic foaming agents can be used for injection molding. The endothermic foaming agents can be based upon bicarbonate and citric acid substances. As the polymer is injected into the mold, the gas expands. The bubbles formed help pack the resin in the mold. Chemical foaming can be done on any existing molding machine with the only restriction that a blowing agent be used that decomposes at a temperature compatible with the processing temperature of the polymer. Using chemical foaming with long glass fiber filled polymeric materials can result in a reduction in the long glass fibers of about 20% as compared to solid injection molding (i.e., non-foamed injection molding), due to an increase in back pressure applied for homogenization of the melt during the plastification stage of the process. To compensate for the loss in mechanical properties due to the decrease in the length of the long glass fibers, decompression technology can be applied. Decompression refers to increasing the part thickness by opening the mold immediately after filling the cavity.

Foaming can be started using standard injection molding conditions for the resin being molded. To adjust the level of foaming, pack pressure and/or packing time should be changed. A decrease in packing will increase foaming and an increase in packing will decrease foaming. Setting the stroke to produce a short shot will also increase the amount of foaming. It can also be desirable to adjust the level of foaming agent used, the melt temperature being used, or the type of foaming agent used. Faster cycle times can be achieved by reducing the packing time. This is possible since the gas pressure in the part is actually packing the part and not hydraulic pressure.

Physical foaming can be achieved by adding a gas such as nitrogen, oxygen, or carbon dioxide within a defined pressure and temperature range to the polymer melt and generally requires a special screw design with mixing elements located in front of the screw. Within this range the gas becomes a supercritical fluid and can be dissolved within the polymer melt during plasticizing. Various techniques can be used to add the gas to the melt as a supercritical fluid, including adding the gas to the melt in the machine barrel (technique 1) and adding the gas to the melt in an adapted hot runner system (technique 2).

Technique 1 involves metering a gas such as nitrogen into the polymer melt stream as it moves down the barrel. The gas is thoroughly mixed into the polymer creating a single phase solution of polymer and gas. Nucleation from the pressure drop of the resin being injected into the mold causes gas bubble formation and cell growth occurs while the part cools, packing the resin into the mold like chemical foaming. To practice foaming using technique 1, special gas delivery equipment needs to be purchased and the injection molding machine needs to be modified. As mentioned, mixing elements are located in front of the screw. These mixing elements cause severe glass fiber breakage.

The level of foaming can be adjusted much like it is in chemical foaming by altering the injection molding process. However, the level of gas in the resin is more controlled in technique 1 and is not limited by finding a blowing agent that decomposes at the right temperature for a given process. The process is limited by the short distance within the barrel where the gas is introduced and has to be homogenized with the melt. By consequence the amount of shear applied over this distance is high. A type of mixing element is used which can apply a high shear load to the melt, thereby causing glass fiber breakage. For example, the average fiber length can be reduced by 25%, for example, 30%, for example, 40% as compared to similarly dimensioned solid parts.

In any foaming process the surface of the part will show a lot of splay due to gas in the resin being smeared between the resin and the surface of the mold. The amount of splay will depend on the level of gas and the level of weight reduction and to some degree the resin being foamed.

In the process disclosed herein to make a part using a long glass fiber filled polymeric material, without a reduction in fiber length, the plasticizing unit of the injection molding machine can be pressurized with a gaseous blowing agent. To prevent the loss of blowing agent at the end of the screw, a seal can be installed between the screw shaft and the plasticizing cylinder. The plasticizing unit can be sealed with an airlock that is mounted between the barrel and the material hopper. Similar to other foaming processes, the plasticizing unit can be equipped with a shut-off nozzle and a position control for the screw to keep the blowing-agent-loaded melt under pressure until it is injected into the mold.

With the use of such a processing technique, the fiber length of the long glass fibers in the foamed part after molding can be greater than or equal to the fiber length of long glass fibers in solid molding. For example, the fiber length can be increased 5% to 40% as compared to a non-foamed part. The fiber length can be increased greater than or equal to 5%. The fiber length can be increased greater than or equal to 10%. The fiber length can be increased greater than or equal to 20%. The fiber length can be increased greater than or equal to 25%. The fiber length can be increased greater than or equal to 30%. The fiber length can be increased greater than or equal to 40%.

Desirable processing conditions can be achieved when an increase in gas pressure is accompanied by an increase of the back pressure, with a difference between the two of greater than or equal to −1 to 10 megaPascals (MPa). The difference can be 0 to 7 MPa. The difference can be 0 to 5 MPa. The difference can be 0 to 0.5 MPa. The difference can be 0.1 to 0.4 MPa. The blowing agent pressure can be 0.1 to 10 MPa, for example, 0.5 to 7.5 MPa, for example 0.75 to 6 MPa, for example 1.5 to 5 MPa, for example, 2.0 to 4.0 MPa. The injection pressure of the injection molding machine can be reduced by greater than or equal to 10% less in making the foamed part including long glass fibers as compared to the injection pressured used to make a similarly dimensioned non-foamed part including long glass fibers. For example, the injection pressure can be reduced by greater than or equal to 20%, for example, greater than or equal to 30% less, for example, greater than or equal to 40% less. A difference between back pressure and the blowing agent pressure of the injection molding machine can be 0 to 10 MPa, for example, 0 to 5 MPa, for example, 0 to 2.5 MPa.

With this setup, the plasticizing unit can be pressurized with any blowing agent that is gaseous at room temperature up to the pressure where the blowing agent liquefies. The equipment can be used with blowing agent pressures of greater than or equal to 7.5 MPa, for example, greater than or equal to 10 MPa, for example, greater than or equal to 15 MPa, for example, greater than or equal to 20 MPa.

The gaseous blowing agent diffuses into the polymer pellets in the plasticizing unit. The time required for saturation of the polymer decreases by increasing the temperature due to the higher diffusion rate at higher temperatures. Therefore, the diffusion in the plasticizing unit is fast enough to allow a continuous injection molding production with cycle times of less than or equal to 40 seconds for preloading the polymer with gas. The cycle time can be less than or equal to 35 seconds. The cycle time can be less than or equal to 30 seconds. The cycle time can be less than or equal to 25 seconds. The blowing agent is dissolved in the molten polymer. As a result, no additional mixing elements which might damage the polymeric material or the glass fibers due to additional shear are necessary.

Blowing agents for this process can include carbon dioxide and nitrogen at pressures of 0.5 to 5.0 MPa, for example greater than or equal to 5.0 MPa. Since the foaming process can be controlled by only two additional process parameters, i.e., type of blowing agent and pressure, the methods disclosed herein for forming a foamed polymer part using long glass fiber filled polymeric material can be accomplished as easily as with chemical blowing agents.

Possible polymeric resins that may be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations comprising at least one of the foregoing.

More particularly, the polymeric can include, but is not limited to, polycarbonate resins (e.g., LEXAN™ resins, commercially available from SABIC's Innovative Plastics business such as LEXAN™ XHT, LEXAN™ HFD, etc.), polyphenylene ether-polystyrene blends (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate blends (e.g., XENOY™ resins, commercially available from SABIC's Innovative Plastics business), copolyester-carbonate resins (e.g. LEXAN™ SLX or LEXAN™ FST resins, commercially available from SABIC's Innovative Plastics business), acrylonitrile butadiene styrene resins (e.g., CYCOLOY™ resins, commercially available from SABIC's Innovative Plastics business), polyetherimide/siloxane resins (e.g., SILTEM™, commercially available from SABIC's Innovative Plastics business), polypropylene resins, for example, long glass fiber filled polypropylene resins (e.g., STAMAX™ resins, commercially available from SABIC's Innovative Plastics business), and combinations comprising at least one of the foregoing resins. Even more particularly, the polymeric resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate) blends of PC, such as PC/ABS blend, and combinations comprising at least one of the foregoing, for example a combination of branched and linear polycarbonate.

In order to attain the desired lightweight foamed part, the polymeric material can also comprise blowing agent(s). The blowing agent(s) can be of the decomposition type (evolves a gas (e.g., carbon dioxide ($CO_2$), nitrogen ($N_2$), and/or ammonia gas) upon chemical decomposition), and/or an evaporation type (which vaporizes without chemical reaction). Possible blowing agents include, carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids (such as formic acid, acetic acid, oxalic acid, ricinoleic acid, and so forth), pentane, butane, ethanol, acetone, nitrogen gas ($N_2$), ammonia gas, and so forth, as well as combinations comprising at least one of the foregoing. Exemplary commercial blowing agents useful for extrusion and molding include, but are not limited to, 6257 ID Endo Foam 35 XFC, 5767 ID Endo Foam 100FC, 8812 ID Exo Foam 80, 8861 ID 25, 6851 ID 35 MFC, 6400 ID 35 NA, 6295 ID 70 XFC, 6265 ID 70 MFC, 7800 ID 70 NA, 6905 ID 90 NA, 6906 ID 90 NA FC, 6258 ID 100 XFC 100, 6836 ID 130 MFC, 6950 ID 40 EEFC, 6952 ID 40 EEXFC, 6112 ID 70 EEFC, 6833 ID 70 EEFC, 8085 ID 70 EEMFC, 7236 ID Foam EEFC, 7284 ID 80 2300 EXO, 7285 OD 80 2400 EXO, 71531 ID 100 MFC EXO, 8016 ID 120 EXO, 6831 ID 135 EXO, Palmarole EXP 141/92B, Palmarole BA.K2.S1, Palmarole BA.F4.S, Palmarole BA.F2.S, Palmarole BA.KS.S, Palmarole BA.F4.E.MG, Palmarole BA.K3.EF, Palmarole BA.M4.E, Palmarole MB.BA10, Palmarole MB.BA.13, Palmarole MB.BA.15, Palmarole MB.BA.16, Palmarole MB.BA.18, Palmarole BA.M7.E, Palmarole BA.K2.S1, Palmarole BA.F4.S, Palmarole BA.K4.S, Palmarole BA.F2.S, Palmarole BA.K3.EF, Palmarole BA.K4.C, and Bergen International Foamazol series 32, 40, 41, 43, 50, 57, 60, 61, 62, 63, 70, 71, 72, 73, 73S, 90, 91, 92, 93, 94, 95, 96, as well as X0-255, X0-256, X0286, X0-330, X0-339, X0-355, X0-379, X0-385, X0-423, X0P-300, X0P-301, X0P-305, and X0P-341.

The blowing agent can be at least one from carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids (such as formic acid, acetic acid, oxalic acid, ricinoleic acid, and so forth), pentane, butane, ethanol, acetone, oxygen gas, nitrogen gas, ammonia gas, and combinations comprising at least one of the foregoing.

When using some classes of blowing agents, endothermic or exothermic types or combinations thereof, $CO_2$ gas is released and eventually exits the extruder as bubbles dispersed in the polymer melt. The bubbles expand to form cells which make up the lightweight foamed part. The cells can be open or closed, but generally are closed. The cells can have an aspect ratio of less than or equal to 10, specifically, less than or equal to 7.5, more specifically, less than or equal to 5, even more specifically, less than or equal to 3. The cells can have a size of less than or equal to 5 millimeters (mm), for example, less than or equal to 2.5 mm, for example, less than or equal to 1 mm, for example, less than or equal to 500 micrometers (μm). The cell size can be less than or equal to 250 micrometers, for example, less than or equal to 200 micrometers, for example, less than or equal to 100 micrometers, for example, less than or equal to 50 micrometers, and for example, less than or equal to 20 micrometers. The amount of chemical blowing agent employed is dependent upon the process, processing conditions, and the specific polymeric material(s).

In some embodiments, the amount of blowing agent can be 0.1 wt. % to 10 wt. %, or, for example, 0.1 wt. % to 5 wt. %, or, for example, 1 wt. % to 4 wt. %, wherein the weight percent is based upon a total weight of the polymer composition (e.g., polymeric material(s), additive(s), blowing agent(s), nucleating agent(s), etc.) In some embodiments, the blowing agent can be 0.1 wt. % to 4 wt. %, or, for example, 0.5 wt. % to 3 wt. %, and 0.25 wt. % to 2 wt. % of an additional, different blowing agent(s), or, for example, 0.5 wt. % to 1.5 wt. % of the additional blowing agent(s). These physical blowing agents encompass $CO_2$, $N_2$, $H_2O$, $O_2$, acetone, butane, and argon. Ozone depleting agents can be avoided due to environmental concerns.

It is anticipated that the choice of resin additive package will be based upon the blowing agent. In other words, an additive package will be included so as to counteract any counterion produced by the blowing agent. Therefore, an additive can be included in the composition such that the pH can be maintained in a desired range such that when counterions are produced they are neutralized. The desired pH will be dependent upon the particular polymeric material. A buffer can be added to the composition (polymer material) to neutralize counterions produced by the blowing agent. The lightweight sheet performance for long-term physical and mechanical properties including low-and-high temperature cycling performance, elevated temperature performance, resistance to environmental effects such as high humidity, etc., is influenced by resin stability. The resin additive package would be required to provide hydrolytic stability for performance of the chemical and/or physical blowing agent, by-products, and nucleation sites in the same manner as it would prevent premature resin decomposition during, for instance, an aggressive extrusion processing step.

During the manufacturing of the lightweight foamed part, most chemical blowing agents leave the residues of the decomposition products in the polymer matrix that may be harmful to the polymer, e.g., that can deteriorate chemical resistance or hydrothermal resistance of the polymer matrix. Choice of chemical blowing agent is important for polycondensation type polymers such as polycarbonates, polyarylates, polyesters and polyetherimides to minimize the harm. For example, if sodium bicarbonate is used as chemical blowing agent for making light-weight polycarbonate sheets, sodium bicarbonate thermally decomposes during the polycarbonate melt processing step into sodium carbonate, water and carbon dioxide, of which water and carbon dioxide work as blowing agent gas to form foamed structure in the polycarbonate sheet while the sodium carbonate residue left inside the final polycarbonate foamed sheet is a relatively strong base that can harm hydrothermal resistance of the polycarbonate matrix if the hydrothermal resistance properties or long-term physical and mechanical properties retention is desired. On the other side, some other chemical blowing agents, with neutral or weak acid or weak base nature of their decomposition product residue at the temperature of the foaming process, may be friendlier to polycarbonate. The examples include mono-sodium citrate, citric acid, 5-phenyl-3,6-dihydro-2H-1,3,4-oxadiazin-2-one (PEDOX), 5-phenyl-1H-Tetrazole (5-PT), as well as combinations comprising at least one of these chemical blowing agents.

The polymeric material includes long glass fibers. Long glass fibers as described herein, include glass fibers with an initial length of greater than or equal to 3 mm. The polymeric can include various additives ordinarily incorporated into polymer compositions of this type, with the proviso that the additive(s) are selected so as to not significantly adversely affect the desired properties of the foamed part, in particular, mechanical properties, such as impact resistance. Such additives can be mixed at a suitable time during the mixing of the polymeric material for the foamed part. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, anti-ozonants, thermal stabilizers, anti-corrosion additives, flow promoters, pigments, dyes radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agent) is generally 0.001 wt % to 5 wt %, based on the total weight of the polymeric material composition.

A method of making a foamed part can include introducing a long glass fiber filled polymeric material to a hopper of an injection molding machine, where the long glass fibers can have an initial, pre-molding length. The long glass fiber filled polymeric material can then be melted. A plasticizing unit of an injection molding machine can then be pressurized with a blowing agent, where a seal can be located between a rotating part and a fixed part of the plasticizing unit. The plasticizing unit can then be sealed with an airlock mounted between a barrel of the injection molding machine to homogenize the melt and the blowing agent. The foamed part can then be formed. In a foamed part made by this process, a post-molding length of the long glass fibers in the foamed part can be greater than or equal to a post-molding length of long glass fibers in a similarly dimensioned foamed part made by injection molding without the pressurized plasticizing unit. The post-molding length of the long glass fibers can be greater than or equal to a post-molding length of long glass fibers in a similarly dimensioned solid (i.e., non-foamed) part.

A weight of the foamed part can be reduced by greater than or equal to 5% as compared to a similarly dimensioned non-foamed part including long glass fibers. For example, the weight reduction can be greater than or equal to 10%. The weight reduction can be greater than or equal to 20%. The weight reduction can be greater than or equal to 30%. Thickness shrinkage of the foamed part can also be reduced when processed via the method disclosed herein with the pressurized unit on the injection molding machine. For example, for a foamed injected plaque with a nominal thickness e.g., 3 mm, a foamed part can have almost 50% less thickness shrinkage than a solid part. For example, for a foamed injected plaque with a nominal thickness of 3 mm, a foamed part can have a thickness of 2.92 mm, while a solid part can have a thickness of 2.85 mm. The foamed part in this instance has nearly 50% less thickness shrinkage than the solid part. For example, a foamed injected plaque with a nominal thickness made using the process disclosed herein can have 5% less thickness shrinkage, for example 10% less thickness shrinkage, for example 25% less thickness shrinkage, for example 30% less thickness shrinkage, for example, 50% less thickness shrinkage, for example, 65% less thickness shrinkage as compared to a non-foamed injected plaque.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the foamed parts can include articles comprising the disclosed long glass fiber filled polymeric materials. In a further aspect, the article comprising the disclosed long glass fiber filled polymeric materials can be used in automotive applications. In a yet further aspect, the article comprising the disclosed long glass fiber filled polymeric materials can be selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In an even further aspect, the article comprising the disclosed long glass fiber filled polymeric materials can be selected from mobile device exteriors, mobile device covers, enclosures for electrical and electronic assemblies, protective headgear, buffer edging for furniture and joinery panels, luggage and protective carrying cases, small kitchen appliances, and toys.

In one aspect, the foamed parts can include electrical or electronic devices including the disclosed long glass fiber filled polymeric materials. In a further aspect, the electrical or electronic device can be a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

The methods disclosed herein can provide favorable results with respect to the use of long glass fiber filled materials since the loss of mechanical properties due to foaming is less compared with other foaming technologies (such as chemical and those foamed with MuCell™ technology) and fiber length is upheld or increased as compared to the original fiber length in solid moldings. Furthermore, initial cost for adapting the injection unit is low as only the pressurizing unit is an additional component. Weight reduction of the foamed parts can be less than or equal to 65%, for example, less than or equal to 50%, for example, less than or equal to 30%, for example, less than or equal to 25%, for example, less than or equal to 20%, for example, less than or equal to 15%, for example, less than or equal to 10%, for example, less than or equal to 5% as compared to a solid (i.e., non-foamed part) part with the same thickness. In certain applications, a weight reduction of less than or equal to 20% can also provide the desired impact properties.

EXAMPLES

Various long glass fiber filled polymeric materials were tested using the method described herein and compared to a solid material. Table 1 list the materials used in the examples. For all tests, 140 mm×90 mm×3 mm plaque was molded with a 1.2 mm film gate, and a 35 mm injection molding machine barrel. The injection molding machine used for processing of the long glass fiber filled polymeric materials was an Arburg Allrounder 520 A 1500-400. Another tool with a central gate diameter equal to 2.5 mm was used for decompression molding (opening of the tool after filling). The mold had dimensions of 200 mm×100 mm and variable thickness. Compositions 1 to 5 included a long glass fiber filled polypropylene polymeric material commercially available from SABIC's Innovative Plastics business. Composition 6 included a short glass fiber filled polypropylene compound (PPC) commercially available from SABIC's Innovative Plastics business. Microanalysis was used to evaluate gas distribution within the foamed samples. Samples were cut to size with the use of a band saw. For cross-sectional images, samples were embedded in epoxy resin. All samples were polished with a polishing machine and images were done with light microscopy. For density measurements, dimensions were measured with a caliper an weighed on an analytical balance. "YM" in the material description refers to a polypropylene monomer, while "YK" in the material description refers to a polypropylene copolymer.

TABLE 1

Materials Information

| Composition No. | Grade | % Fiber Content | Company |
| --- | --- | --- | --- |
| 1 | STAMAX™ 20YM240 | 20% long glass fiber | SABIC's Innovative Plastics Business |
| 2 | STAMAX™ 30YM240 | 30% long glass fiber | SABIC's Innovative Plastics Business |
| 3 | STAMAX™ 40YM240 | 40% long glass fiber | SABIC's Innovative Plastics Business |
| 4 | STAMAX™ 20YK270E | 20% long glass fiber | SABIC's Innovative Plastics Business |

TABLE 1-continued

Materials Information

| Composition No. | Grade | % Fiber Content | Company |
| --- | --- | --- | --- |
| 5 | STAMAX™ 30YK270E | 30% long glass fiber | SABIC's Innovative Plastics Business |

Example 1

Weight Reduction

Weight reduction of the foamed parts, Example Nos. 1-4, and 1-5, having a thickness of 3 mm as compared to reference parts, Example Nos. 1-1, 1-2, and 1-3, having the same thickness, was nearly 30% for all different grades of STAMAX™ used as can be seen in Table 2. Using the process disclosed herein, weight reduction can be achieved without any additional processing requirements, such as injection decompression.

TABLE 2

Weight Reduction Results

| Example No. | Composition No. | Solid Injection Weight | Foamed Injection Weight | Weight Reduction in % |
| --- | --- | --- | --- | --- |
| 1-1 | 1 | 43.6 | | |
| 1-2 | 2 | 47.2 | | |
| 1-3 | 3 | 52 | | |
| 1-4 | 1 | | 30.5 | 30 |
| 1-5 | 2 | | 34.6 | 27 |

Example 2

Cell Structure and Density

FIGS. 1A to 1F illustrate cut sections of a foamed plaque of Example 1-4 having a 30% weight reduction as compared to the same size solid part, Example 1-1. The foamed cells in the final part were well distributed as can be seen in FIG. 1. Cross and in-flow sections for Example 1-5 showed a weight reduction of greater than 20%. As can be seen in FIGS. 2A to 2F, the surface layer was well defined closer to the gate, but thicker to the end. The cell structure appears to be similar in all sections. FIGS. 2A to 2F illustrate cut sections of a foamed plaque of Example 1-5 having a 20% weight reduction as compared to the same size solid part, Example 1-2.

As can be seen in Table 3, density measurements performed on samples with 20% weight reduction, showed that variation of the density within the sample is very low and is almost equal through the different sections of the part. FIGS. 3A to 3C illustrate the positions on the samples where the measurements (including samples for microscopy analysis) were taken, where the gate is indicated by reference number 10 and the direction of flow is indicated by arrow 12.

TABLE 3

Density through different sections of the plaques

| Example No. | Composition No. | Position | Average Dimensions (mm) | | | Volume (cm³) | Weight (g) | Density (g/cm³) |
|---|---|---|---|---|---|---|---|---|
| | | | length | width | thickness | | | |
| 2-1 | 4 | G | 37.7 | 20.0 | 3.0 | 2.2 | 1.916 | 0.86 |
| 2-1 | 4 | H | 38.0 | 20.6 | 3.0 | 2.3 | 2.002 | 0.87 |
| 2-1 | 4 | I | 38.6 | 20.6 | 3.0 | 2.3 | 2.035 | 0.87 |
| 2-2 | 5 | G | 38.9 | 20.2 | 3.0 | 2.3 | 2.064 | 0.88 |
| 2-2 | 5 | H | 38.7 | 20.1 | 3.0 | 2.3 | 2.048 | 0.88 |
| 2-2 | 5 | I | 38.5 | 20.3 | 3.0 | 2.3 | 2.039 | 0.87 |
| 2-3 | 2 | G | 38.2 | 20.5 | 3.0 | 2.3 | 1.920 | 0.82 |
| 2-3 | 2 | H | 38.4 | 20.6 | 3.0 | 2.4 | 1.952 | 0.83 |
| 2-3 | 2 | I | 38.6 | 19.9 | 3.0 | 2.3 | 1.916 | 0.84 |

Figure 4A:
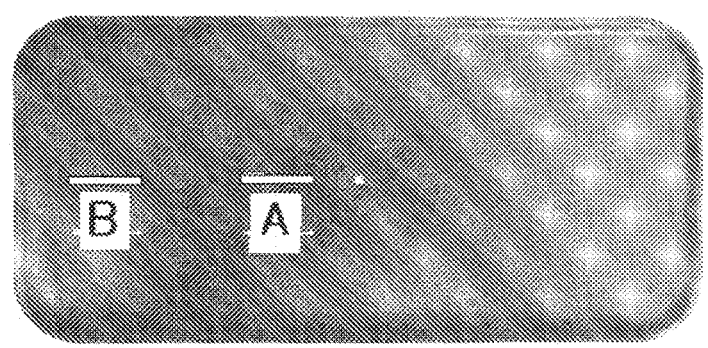
FIGS. 4A and 4B are pictures of a foamed plaque illustrating positions where light microscopy was performed on decompression samples.
Figure 4B:
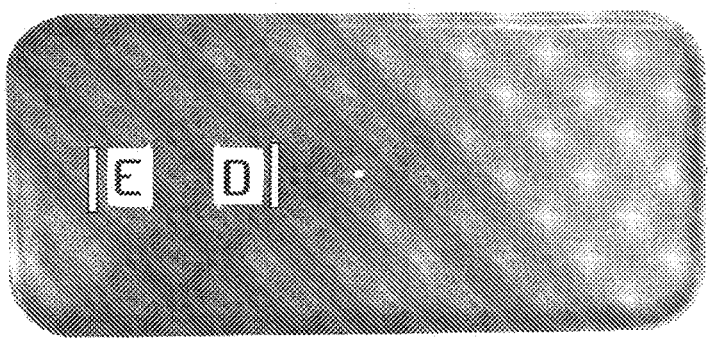
Figure 5A:
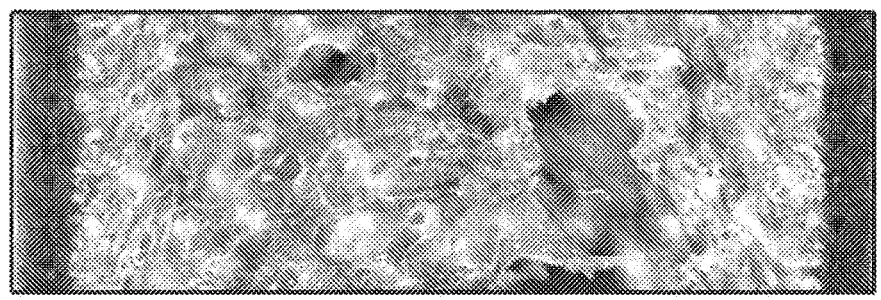
FIGS. 5A to 5D are pictures of a cut section of the foamed plaque with 2.3 times the original thickness molded with Composition No. 2.
Figure 5B:
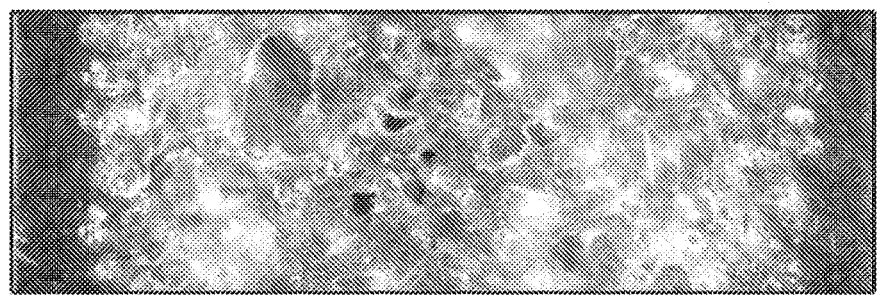
Figure 5C:
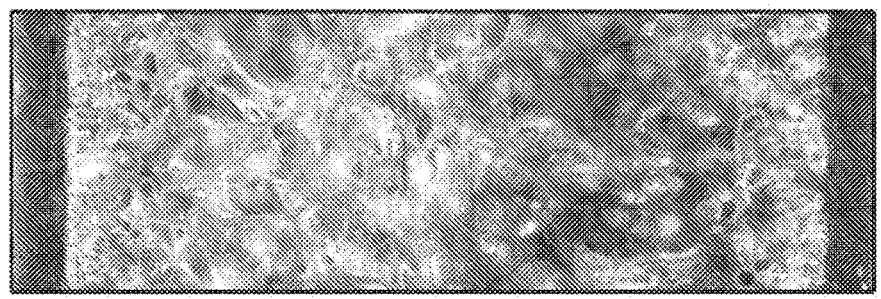
Figure 5D:
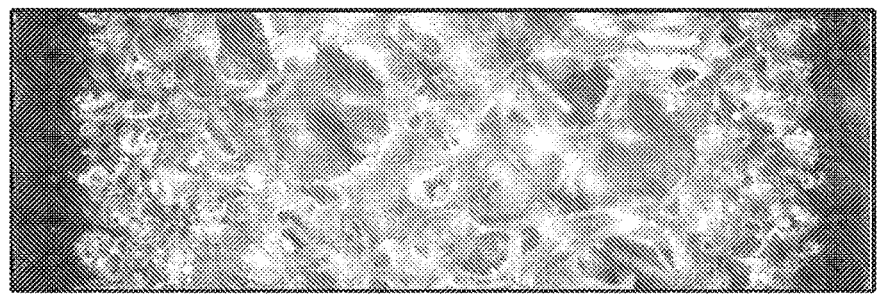

Cross and in-flow sections for plaques molded with STAMAX™ 30YM240, and decompression to 2.3 times original thickness, i.e., Example 2-3, are displayed in FIGS. 4A, 4B, and FIGS. 5A to 5D, where FIGS. 4A and 4B illustrate the positions where the measurements were taken. As can be seen in FIGS. 5A to 5D, the cell structure is much more irregular with some large gap openings due to decompression (i.e., opening of the tool). Nevertheless the entire structure seems still relatively stable and if eventual improvement of the melt strength of the polymer can be achieved, it is believed that the structure could be quite uniform.

Figure 6B:
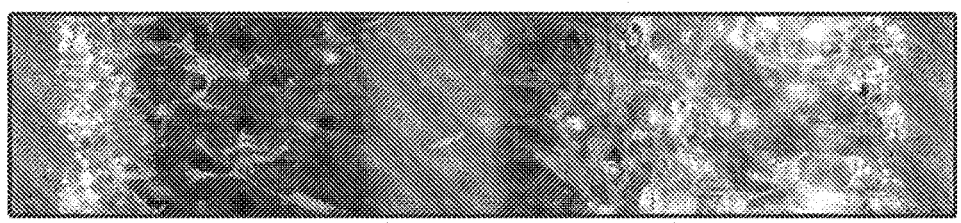
FIGS. 6A and 6B are pictures of a cut section of the foamed plaque with 4 times the original thickness molded with Composition No. 5.
Figure 6A:
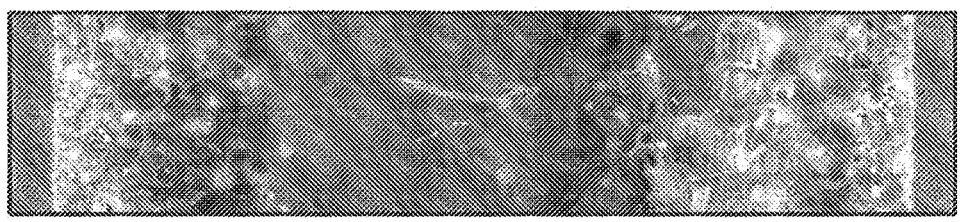

Cross and in-flow sections for plaques molded with STAMAX™ 30YK270E, i.e., Example 2-2 and decompression to 4 times original thickness are displayed in FIGS. 6A and 6B. As can be seen, cell structure is not consistent and clear separation of the layers is observed in the middle of the sample. Although not wishing to be bound by theory, it appears as though the polymer bonds are not present in the middle of the part and only the glass fibers establishing connection between the two separated layers. This indicates that increase of the thickness by decompression greater than 2 to 2.5 times the original thickness is not applicable for applications with high mechanical requirements, but could be a useful technology for applications with sound and insulation requirements.

Core-shell structure is observed in most samples. The core contains polymer resin, glass fibers and voids. The shell contains only polymer resin and glass fibers. The shell thickness can vary from 0.2 mm to 0.5 mm, for this particular thickness. The shell becomes thicker when further away from the gate.

Example 3

Processing

In this example, it was found that addition of a foaming agent reduced shrinkage of the injected plaques. The thickness measurement indicated that plaques without foaming had a thickness of 2.85 mm and those, which were foamed had a measured thickness of 2.92 mm to 2.96 mm.

It was also found that injection pressure could be reduced by 10 to 20%. It was further discovered that the gas pressure has an influence on the foaming of the part. For example, increase of gas pressure has to be accompanied by the increase of the back pressure as well, because the gas pressure acts like a contra pressure against back pressure and if back pressure is under the pressure of the gas, then plasticizing is difficult. In these examples, a gap of 0.5 MPa was left between the gas pressure and the back pressure. With the use of higher gas pressure and back pressure respectively as well, the weight reduction in the part was better. It was observed that change of the gas pressure from 3.5 MPa to 5.0 MPa yields an additional 2.5% weight reduction. However, a negative impact on the fiber length was observed.

Use of the higher injection speed led to an additional 1% weight reduction, but also displayed a 10% reduction of the fiber length. Reduction in mechanical properties also has to be considered. Weight reduction with this parameter compared with loss of properties due to a fiber breakage is not desirable.

In terms of decompression molding, the packing time, i.e., the time after injection when opening of the mold is occurring, has an important role in determining the thickness of the surface layer of the molded part and also the overall mechanical performance. This time cannot be too long, because the inner layer still has to be melted, when opening occurs to allow the gas to expand. Thickness of the part is a main factor in determining this time. For the particular parts used in this study, the time was 5 seconds.

Example 4

Fiber Length

Fiber length is a parameter of interest in the mechanical performance of long glass fiber filled materials. Measurement of the fiber length was performed on the purge for all foamed conditions and for conditions without foaming as a reference point. Apart from the purge, for all samples, measurement was done at the end of the flow path at 20 mm of the far end of the plaque and for most of the samples fiber measurement was done also at a position after the gate, i.e., 20 mm after the gate.

Figure 7:
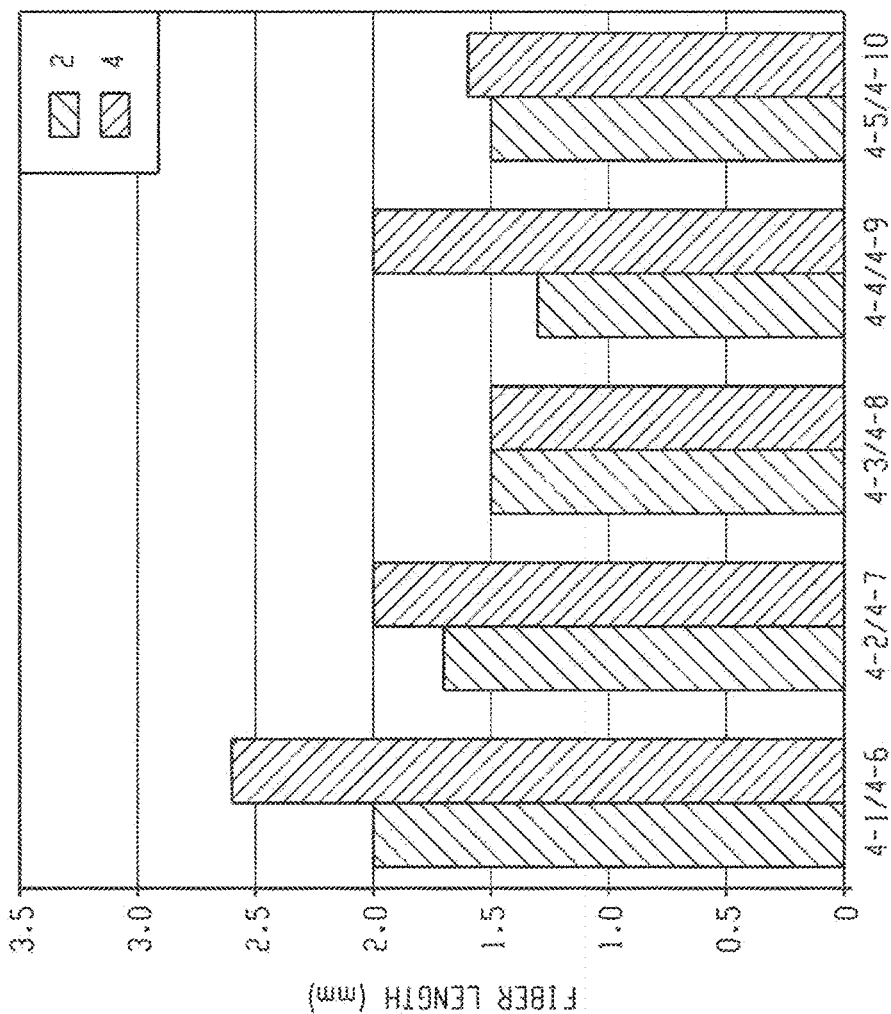
FIG. 7 is a graphical illustration of fiber length measurements in the molded parts.

Measured fiber length in the specimens collected at 20 mm from the far end of the plaque with solid STAMAX™ material 2 and with foamed STAMAX™ material 4 is illustrated in FIG. 7. Examples 4-1 and 4-6 were made from Composition No. 1 with Example 4-1 being solid and Example 4-6 being foamed. Examples 4-2 and 4-7 were made from Composition No. 2 with Example 4-2 being solid and Example 4-7 being foamed. Examples 4-3 and 4-8 were made from Composition No. 3 with Example 4-3 being solid and Example 4-8 being foamed. Examples 4-4 and 4-9 were made from Composition No. 4 with Example 4-4 being solid and Example 4-9 being foamed, and Examples 4-5 and 4-10 were made from Composition No. 5 with Example 4-5 being solid and Example 4-10 being foamed. The glass fiber length in the foamed samples is clearly longer than solid samples. This indicates that by applying a pressurized unit during foaming injection molding, the glass fiber length is not only maintained as the glass fiber length for solid material, but actually an increase of the fiber length can be present.

Figure 8:
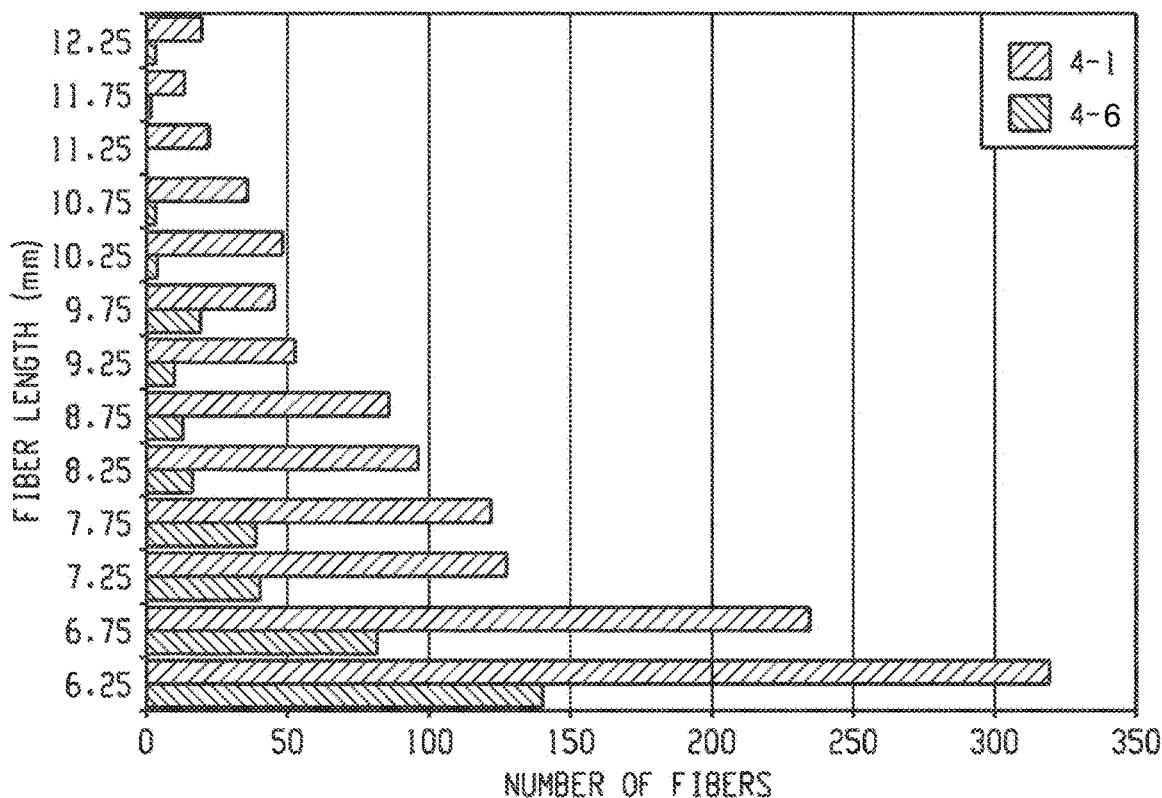
FIG. 8 is a graphical illustration of the number of long fibers in the molded parts made by solid injection molding and made by foaming injection molding.

From the results, it is clear that parts processed with foaming have longer fibers. Table 3 illustrates this advantage. This difference varies from few percent's up to 30%. Another observation related to a fiber length measurements, is the glass content dependency. With increase of the glass content into material the length difference decreases, but for 20% and 30% of the glass content, the length difference is still significant. A conclusion from the fiber measurements is that with this type of foaming the fiber length did not decrease, but even better-some increase was observed for foamed samples. This is very beneficial for the LGF materials, since all other foaming techniques cause certain fiber breakage and reduction of the fiber length. FIG. 8 illustrates that for Examples 4-1 (solid) and 4-6 (foamed), the quantity of long glass fibers, i.e., greater than or equal to 6 mm, are greater in the foamed part.

TABLE 4

Fiber length measurement

| Measurement* (mm) | Ex. No. | | | | | | | | | |
|---|---|---|---|---|---|---|---|---|---|---|
| | 4-1 | 4-6 | 4-2 | 4-7 | 4-3 | 4-8 | 4-4 | 4-9 | 4-5 | 4-10 |
| After Gate | 2.1 | 2.2 | 1.8 | 1.8 | — | — | 1.4 | 1.9 | 1.4 | 1.6 |
| End of Fill | 2.0 | 2.6 | 1.7 | 2.0 | 1.5 | 1.5 | 1.3 | 2.0 | 1.5 | 1.6 |

*Fiber length is measured by calcination of the sample and optically measurement of the remaining glass fibers.

Figure 11:
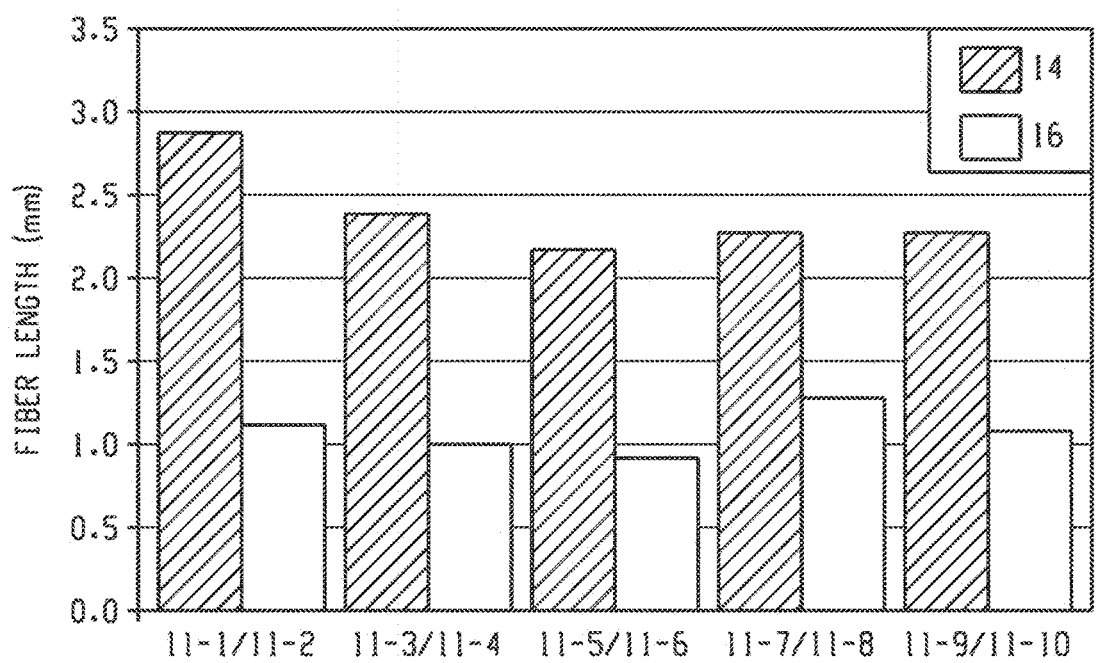
FIG. 11 is a graphical illustration of various molded samples and their corresponding fiber length.

FIG. 11 illustrates fiber length measurements in the purge with foaming for the method disclosed herein and the MuCell™ method. Samples 11-1 and 11-2 were made from Composition 1 in Table 1, Samples 11-3 and 11-4 were made from Composition 2 in Table 1, Samples 11-5 and 11-6 were made from Composition 3 in Table 1, Samples 11-7 and 11-8 were made from Composition 4 in Table 1, and Samples 11-9 and 11-10 were made from Composition 5 in Table 1. Samples 11-1, 11-3, 11-5, 11-7, and 11-9 were made using the method disclosed herein (reference number 14), while Samples 11-2, 11-4, 11-6, 11-8, and 11-10 were made using the MuCell™ method (reference number 16). As can be seen from FIG. 11, fiber length in the purge after foaming are greater for each composition tested with the method disclosed herein.

Example 5

Ash Content and X-Rays

Figure 9:
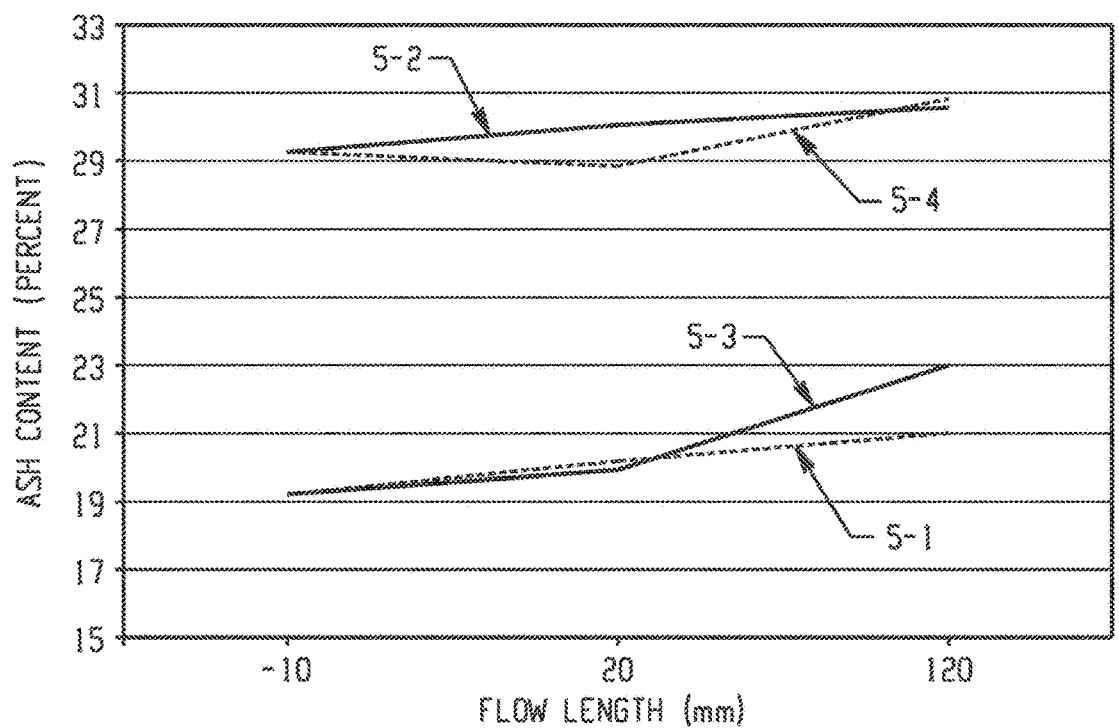
FIG. 9 is a graphical illustration of the ash content in solid and foamed parts.

Ash content was measured in the solid parts and in foamed parts as well. Examples 5-1 and 5-3 were made from Composition 1, where Example 5-1 was solid and Example 5-3 was foamed. Examples 5-2 and 5-4 were made from Composition No. 2, where Example 5-3 was solid and Example 5-4 was foamed. Measurement was done in three locations plus one location in the sprue, and the results are illustrated in FIG. 9 where flow length measured in mm is indicated horizontally and ash content in percent is indicated vertically. The first measurement is in the sprue and is indicated as −10 mm. The 0 point is assumed to be the gate of the part.

From the results it can be concluded that the ash content at the end of the fill is higher for foamed plaques than solid ones. This can be associated with transport of longer fibers present in foamed parts at the end of the flow.

Example 5

Density Distribution

Figure 10:
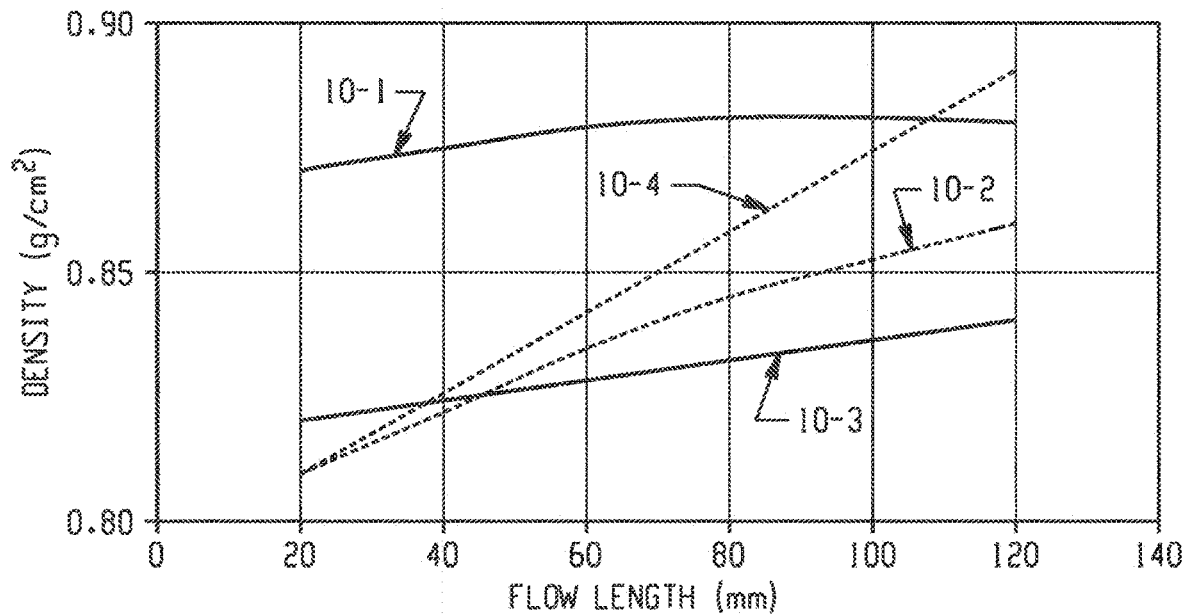
FIG. 10 is a graphical illustration of the flow length versus density of molded parts as described herein.

Results for density distribution along a flow path for the MuCell™ technology and the method disclosed herein are illustrated in FIG. 10 where density measured in g/cm$^3$ is plotted versus flow length measured in mm. Samples 10-1 and 10-2 were made from the same grade of polypropylene having Composition 5 listed in Table 1, while Samples 10-3 and 10-4 were made from the sample grade of polypropylene having Composition 2 listed in Table 1. Samples 10-1 and 10-3 were processed according to the method disclosed herein with an injection rate of 45 cubic centimeters per second (cm$^3$/s), while Samples 10-2 and 10-4 were processed according to the MuCell™ method with an injection rate of 100 cm$^3$/s. As can be seen in FIG. 10, Samples 10-1 and 10-3 demonstrate uniform density distribution with a negligible difference between the beginning and end of the flow. Conversely, Samples 10-2 and 10-4 demonstrate a difference of up to 10%, which is even starker when taking into consideration that the injection rate for Samples 10-2 and 10-4 was over double that of Samples 10-1 and 10-3. Density distribution can have an influence on the properties and final performance of any articles molded.

Example 6

Flexural Properties

Flexural properties were measured according to Isotropic Flexural Strength according to ISO 178:2001/Amd 1:2004 and measured in Newtons per square meter (N/m$^2$). FIGS. 12A to 12D illustrate the results where isotropic flexural strength was observed to be higher for samples processed according to the method disclosed herein as compared to samples processed according to the MuCell™ method. Samples 12A1-4 were made from Composition 1 in Table 1, Samples 12B1-B4 were made from Composition 2 in Table 1, Samples 12C1-4 were made from Composition 4 in Table 1, and Samples 12D1-4 were made from Composition 5 in Table 1. Each of Samples 12A1-2, 12B1-2, 12C1-2, and 12D1-2 were not foamed, while Samples 12A3-4, 12B3-4, 12C3-4, and 12D3-4 were foamed with a 20% weight reduction. Samples 12A1, 12A3, 12B1, 12B3, 12C1, 12C3, 12D1, and 12D3 were made according to the method disclosed herein, while Samples 12A2, 12A4, 12B2, 12B4, 12C2, 12C4, 12D2, and 12D4 were made according to the MuCell™ method. Samples 12A3, 12A4, 12B3, 12B4, 12C3, 12C4, 12D3, and 12D4 each had a 20% weight reduction as compared to the solid samples. As can be seen in FIGS. 12A-12D, flexural strength is higher for the samples produced according to the method disclosed herein. For example, flexural properties are higher with the method disclosed herein for the foamed samples than for the foamed samples made according to the MuCell™ method.

Example 7

Impact Properties

Figure 13A:
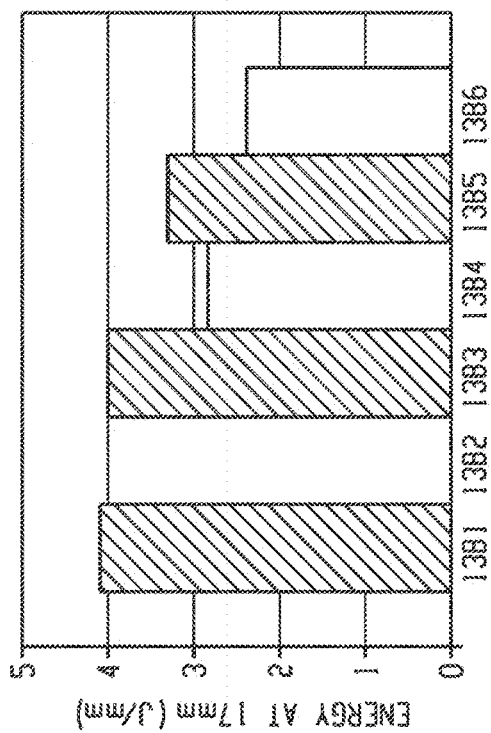
FIGS. 13A and 13B are graphical illustrations of the impact strength of various molded samples as described herein.
Figure 13B:
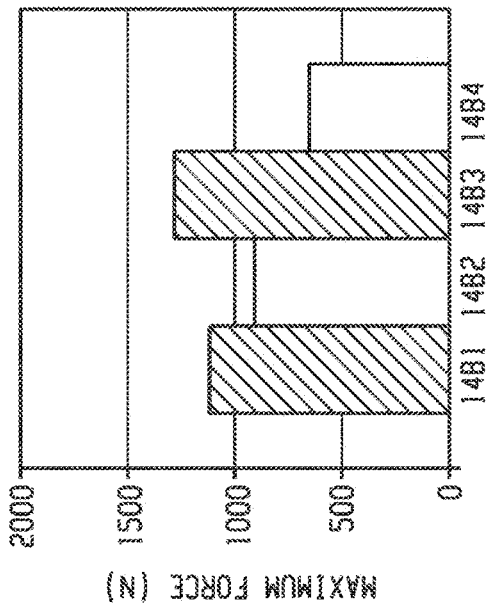

Impact properties were measured according to ISO 6603-2:2000 (A3). Samples 13A1-13A6 were made from Composition 1 in Table 2, while Samples 13B1-13B2 were made from Composition 5 in Table 1. Samples 13A1, 13A2, 13B1, and 13B2 were made without foaming; Samples 13A3, 13A4, 13B3, and 13B4 were made by foaming with a 20% weight reduction where Samples 13A3 and 13B3 were made according to the method disclosed herein and Samples 13A4 and 13B4 were made according to the MuCell™ method; Samples 13A5, 13A6, 13B5, and 13B6 were made by foaming with a 30% weight reduction, wherein Samples 13A5 and 13B5 were made according to the method disclosed herein and Samples 13A6 and 13B6 were made according to the MuCell™ method. Penetration energy at 17 mm displacement measured in Joules per millimeter (J/mm) was measured and is plotted in FIGS. 13A and 13B. As can be seen in FIGS. 13A and 13B, impact properties are higher for the samples processed with the method disclosed herein as compared to the samples processed with the MuCell™ method. Additionally, reduction of the penetration energy for Samples 13A3, 13A4, 13B3, and 13B4 is lower for samples 13A3 and 13B4, both processed with the method disclosed herein likely due to the longer fibers in each part.

Figure 14A:
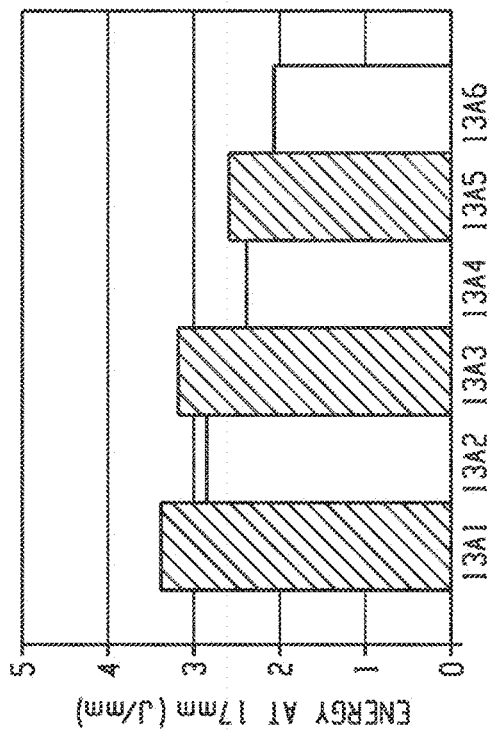
FIGS. 14A and 14B are graphical illustrations of the impact strength of displacement molded samples as described herein.
Figure 14B:
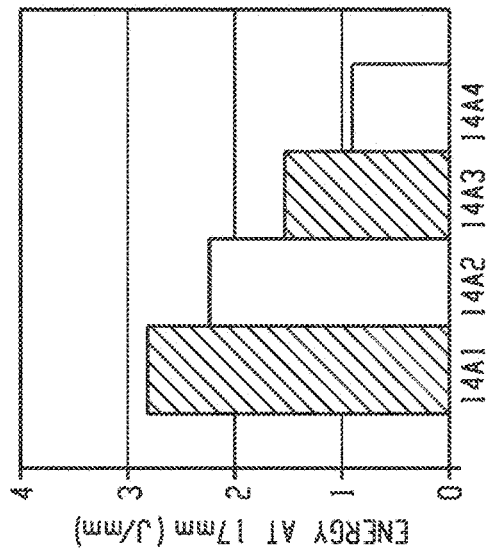

Impact properties for decompression molded samples were also tested according to ISO 6603-2:2000 (A3). Results are illustrated in FIGS. 14A and 14B, where, all of the samples were made with Composition 2. Samples 14A1, 14A2, 14B1, and 14B2 were made without foaming, while Samples 14A3, 14A4, 14B3, and 14B4 were foamed with a thickness 2.3 times the thickness of the solid part. Samples 14A1, 14A3, 14B1, and 14B3 were made according to the method disclosed herein, while Samples 14A2, 14A4, 14B2, 14B4 were made according to the were made according to the MuCell™ method. FIG. 14A illustrates penetration energy at a displacement of 17 mm measured in J/mm and FIG. 14B illustrates the maximum force measured in Newtons (N). As can be seen in FIG. 14B, for the samples processed according to the method disclosed herein, in terms of using decompression molding, the maximum impact force is increased when thickness is increased, but for the samples process using the MuCell™ method, where despite a thickness increase, the maximum force is reduced. FIG. 14A illustrates that impact energy at 17 mm displacement is reduced due to foaming, but less so with the method disclosed herein than with the MuCell™ method.

Aspect 1: A method of making a foamed part, comprising: introducing a long glass fiber filled polymeric material to a hopper of an injection molding machine, wherein the long glass fibers have a pre-molding length; melting the long glass fiber filled polymeric material to form a melt; pressurizing a plasticizing unit of the injection molding machine with a blowing agent, wherein a seal is located between a rotating part and a fixed part of the plasticizing unit; having a seal between rotating and fixed part of the plasticizing unit; sealing the plasticizing unit with an airlock mounted between a barrel of the injection molding machine and the hopper; increasing a pressure of the blowing agent and increasing a back pressure of the injection molding machine to homogenize the melt and the blowing agent; and forming the foamed part; wherein a post-molding length of the long glass fibers in the foamed part is greater than or equal to a post-molding length of long glass fibers in a similarly dimensioned foamed part made without the pressurized plasticizing unit.

Aspect 2: The method of Aspect 1, wherein the post-molding length of the long glass fibers in the foamed part is greater than or equal to a post-molding length of long glass fibers in a similarly dimensioned non-foamed part.

Aspect 3: The method of Aspect 1 or Aspect 2, wherein the blowing agent is a gaseous blowing agent.

Aspect 4: The method of Aspect 3, wherein the blowing agent is at least one from carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids (such as formic acid, acetic acid, oxalic acid, ricinoleic acid, and so forth), pentane, butane, ethanol, acetone, oxygen gas, nitrogen gas, ammonia gas, and combinations comprising at least one of the foregoing.

Aspect 5: The method of Aspect 4, wherein the blowing agent is at least one from nitrogen gas, oxygen gas, carbon dioxide gas, and a combination comprising at least one of the foregoing.

Aspect 6: The method of any of Aspects 1-5, wherein a weight of the foamed part is reduced by greater than or equal to 5% as compared to a similarly dimensioned non-foamed part including long glass fibers.

Aspect 7: The method of any of Aspects 1-6, wherein a foamed injected plaque has 10% less thickness shrinkage as compared to a non-foamed injected plaque.

Aspect 8: The method of any of Aspects 1-7, wherein a foamed injected plaque has 50% less thickness shrinkage as compared to non-foamed injected plaque.

Aspect 9: The method any of Aspects 1-8, wherein the blowing agent pressure and the back pressure of the injection molding machine differ by greater than or equal to 0 megaPascals.

Aspect 10: The method of any of Aspects 1-9, wherein the blowing agent pressure or the back pressure of the injection molding machine is 0 to 10 megaPascals.

Aspect 11: The method of any of Aspects 1-10, wherein the difference between back pressure and the blowing agent pressure of the injection molding machine is 0 to 5 megaPascals.

Aspect 12: The method of any of Aspects 1-11, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

Aspect 13: The method of any of Aspects 1-12, wherein an injection pressure of the injection molding machine is greater than or equal to 10% less in making the foamed part as compared to the injection pressure when making a non-foamed part including long glass fibers.

Aspect 14: A polymeric part made by the method of any of Aspects 1-13.

Aspect 15: A foamed part, comprising: a long glass fiber filled polymeric material, wherein the long glass fibers have an initial length before molding of the foamed part and a final length after molding of the foamed part; wherein a post-molding length of the long glass fibers in the foamed part is greater than or equal to a post-molding length of long glass fibers in a similarly dimensioned foamed part made without a pressurized plasticizing unit.

Aspect 16: The foamed part of Aspect 15, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

Aspect 17: The foamed part of Aspect 15 or Aspect 16, wherein the final length of the long glass fibers in the foamed part is increased as compared to a similarly dimensioned non-foamed part including long glass fibers.

Aspect 18: The foamed part of any of Aspects 15-17, wherein a weight of the foamed part is reduced by greater than or equal to 5% as compared to a similarly dimensioned non-foamed part including long glass fibers.

Aspect 19: The foamed part of any of Aspects 15-18, wherein a foamed injected plaque has 10% less thickness shrinkage as compared to a non-foamed injected plaque.

Aspect 20: The foamed part of any of Aspects 15-19, wherein the foamed part has a number of long glass fibers that is greater than or equal to a number of long glass fibers in a similarly dimensioned non-foamed part including long glass fibers.

Aspect 21: The foamed part of any of Aspects 15-20, wherein a thickness of the foamed part is increased greater than or equal 50% a thickness of a non-foamed part including long glass fibers.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise specified herein, any reference to standards, regulations, testing methods and the like, such as ISO 6603 and ISO 178 refer to the standard, regulation, guidance or method that is in force at the time of filing of the present application.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a foamed part, comprising:
introducing a glass fiber filled polymeric material to a hopper of an injection molding machine, wherein the glass fibers have a pre-molding length;
melting the glass fiber filled polymeric material to form a melt;
pressurizing a plasticizing unit of the injection molding machine with a blowing agent, wherein a seal is located between a rotating part and a fixed part of the plasticizing unit, the seal between a screw shaft and a plasticizing cylinder at an end of the screw shaft of the plasticizing unit to prevent loss of blowing agent;
sealing the plasticizing unit with an airlock mounted between the plasticizing cylinder of the injection molding machine and the hopper to homogenize the melt and the blowing agent;
increasing a pressure of the blowing agent and increasing a back pressure of the injection molding machine to homogenize the melt and the blowing agent, wherein the screw shaft is in a screw and is under a pressure with a relatively flat pressure profile to prevent breakage of the glass fibers; and
forming the foamed part;
wherein a post-molding length of the glass fibers in the foamed part is greater than or equal to a post-molding length of glass fibers in a similarly dimensioned foamed part made without pressurizing the plasticizing unit due to glass fiber breakage caused by shear stress during homogenizing of the melt and the blowing agent.

2. The method of claim 1, wherein the post-molding length of the glass fibers in the foamed part is greater than or equal to a post-molding length of glass fibers in a similarly dimensioned non-foamed part.

3. The method of claim 1, wherein the blowing agent is a gaseous blowing agent.

4. The method of claim 3, wherein the blowing agent is at least one from carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids, formic acid, acetic acid, oxalic acid, ricinoleic acid, pentane, butane, ethanol, acetone, oxygen gas, nitrogen gas, ammonia gas, and combinations comprising at least one of the foregoing.

5. The method of claim 4, wherein the blowing agent is at least one from nitrogen gas, oxygen gas, carbon dioxide gas, and a combination comprising at least one of the foregoing.

6. The method of claim 1, wherein a weight of the foamed part is reduced by greater than or equal to 5% as compared to a similarly dimensioned non-foamed part including glass fibers.

7. The method of claim 1, wherein a foamed injected plaque has 10% less thickness shrinkage as compared to non-foamed injected plaque.

8. The method of claim 1, wherein the blowing agent pressure and the back pressure of the injection molding machine differ by 0.1 to 0.4 MegaPascals.

9. The method of claim 1, wherein the blowing agent pressure is 0.1 to 10 MegaPascals.

10. The method of claim 1, wherein the blowing agent pressure is 1.5 to 5 MegaPascals.

11. The method of claim 1, wherein the polymeric material is at least one from polycarbonate, polypropylene, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

12. The method of claim 1, wherein an injection pressure of the injection molding machine is greater than or equal to 10% less in making the foamed part as compared to the injection pressure when making a non-foamed part including glass fibers.

13. The method of claim 1, wherein the glass fibers have a pre-molding length of greater than or equal to 3 mm.

14. The method of claim 1, wherein the blowing agent pressure and the back pressure of the injection molding machine differ by greater than 0 to 5 MegaPascals.

15. The method of claim 4, wherein the gaseous blowing agent diffuses into polymer pellets in the plasticizing unit.

16. The method of claim 1, comprising mixing the blowing agent with polymer pellets prior to the polymer pellets being fed into a feed throat of the injection molding machine.

* * * * *